W. HOPPIE.
SOUND INTENSIFIER FOR TELEPHONES.
APPLICATION FILED MAY 24, 1909.

1,012,854.

Patented Dec. 26, 1911.

Witnesses
M. Unsworth.
W. G. Dalrymple.

Inventor
William Hoppie,
per
Attorney

UNITED STATES PATENT OFFICE.

WILLIAM HOPPIE, OF OGDEN, UTAH, ASSIGNOR OF ONE-FOURTH TO WILLIAM COUNTS, OF SPARKS, NEVADA, AND ONE-FOURTH TO ALBERT G. HORN, OF OGDEN, UTAH.

SOUND-INTENSIFIER FOR TELEPHONES.

1,012,854.  Specification of Letters Patent.  Patented Dec. 26, 1911.

Application filed May 24, 1909. Serial No. 497,980.

*To all whom it may concern:*

Be it known that I, WILLIAM HOPPIE, of Ogden city, in the county of Weber and State of Utah, have invented certain new and useful Improvements in Sound-Intensifiers for Telephones; and I do hereby declare the following to be a full, clear, and exact description of the invention, such as will enable others skilled in the art to which it appertains to make and use the same.

The principal object of this invention is to effectually intensify sounds transmitted over telephone circuits and to do this in such manner as to free them of the usual metallic sounds.

Figure 5:
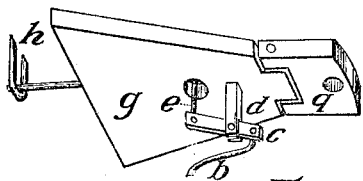
Figure 2:
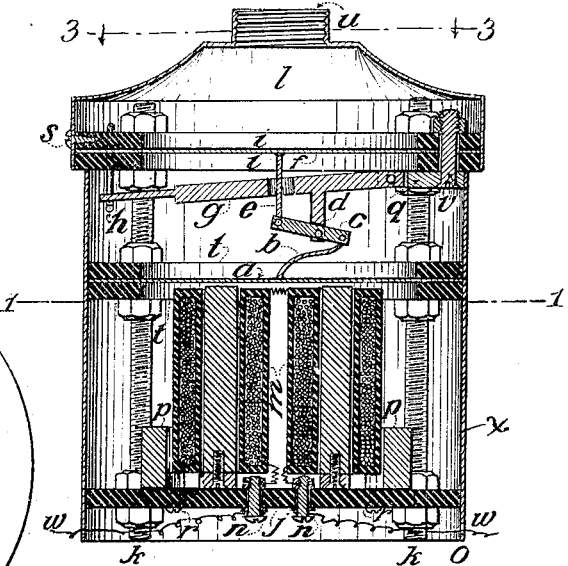
Figure 3:
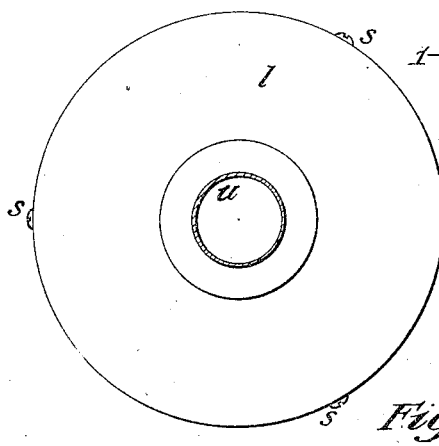
Figure 4:
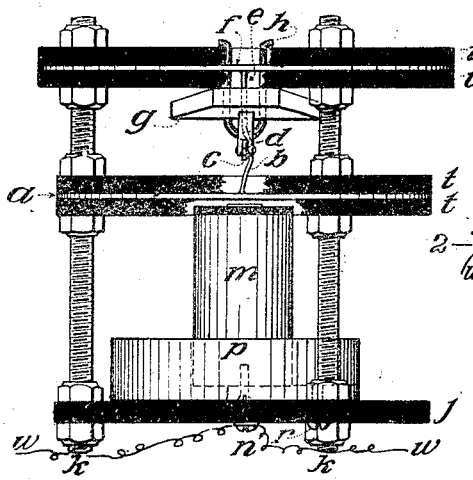
Figure 1:
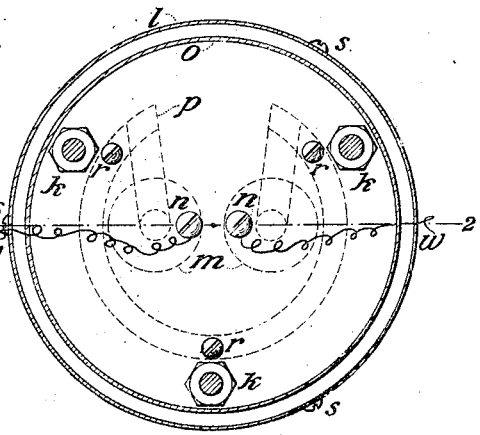

In order to more fully describe my invention, reference will be had to the accompanying drawings wherein, Figure 1 is a section on line 1—1, Fig. 2, looking down and showing the magnets in dotted lines. Fig. 2 is a vertical section of the entire device on line 2—2, Fig. 1. Fig. 3 is a section on line 3—3, Fig. 2, looking down. Fig. 4 represents, in side elevation, the operating parts of the device removed from the inclosing casing. Fig. 5 is a detail perspective view of the lever mechanism for intensifying the sound.

The form of the invention shown comprises, among other parts, a diaphragm $a$ of suitable magnetic metal, preferably a thin sheet of ferrotype, and is supported by being clamped between two rings $t, t$, of fiber or other suitable material, supported upon screws $k, k$, which are in turn supported upon a base $j$ of fiber or other suitable material. Mounted above the diaphragm $a$ is a second diaphragm $f$ which may be of any suitable material for transmitting or reproducing sound. This second diaphragm is supported by being clamped between two fiber or other suitable rings $i, i$, which are shown as being clamped between nuts of the supporting screws $k, k$. Located between the two diaphragms in a system of levers for mechanically transmitting, with increased amplitude, the vibrations of diaphragm $a$ to diaphragm $f$. This system of levers comprises, among other parts, two small arms $b$ and $e$, each having one end rigidly connected respectively to the diaphragms $a$ and $f$. The other ends of these arms are pivoted respectively to the ends of a small lever $c$ which is fulcrumed between its connections with arms $b$ and $e$ to a depending arm $d$ on a balancing lever $g$ pivoted at one end to a plate $q$ rigidly secured by means of screw $v$ to the supporting rings $i, i$. The end of this lever, opposite its pivotal support, is provided with an extension which passes between the side members and rests upon the yoke of a staple $h$ supported for vertical adjustment in the rings $i, i$. By varying the height of this staple $h$ the weight of the arm $g$ on the lever $c$ may be varied and thereby made to regulate the device. The sound may also be governed by regulating the weight and size of the arm $g$. The metallic sounds usually accompanying sound transmission are completely eliminated by the arm $g$ attached to the lever which acts as a neutralizer.

The initial vibration is imparted to the diaphragm $a$ by means of electro-magnets $m, m$, connected by circular permanent magnet yoke $p$ and mounted upon the base plate $j$ as a support. The windings of these magnets are connected to terminal binding posts $n, n$, over which pass wires $w, w$, of the telephone circuit or other circuit used to energize the magnets $m, m$.

The parts above described are inclosed in a suitable casing $x$ having a cover $l$ secured to the rings $i, i$, by means of screws $s$. This cover has an opening in its top which may be provided with a screw threaded flange $u$ to be secured to a tube, megaphone or other sound conveying means.

While I have herein described one specific embodiment of my said invention, I do not wish to be understood as limiting my invention to this specific form alone.

I claim as my invention:—

1. A sound intensifier for telephones comprising two or more vibratory diaphragms, electrical means adapted to initially vibrate one of said diaphragms, a lever pivoted to each of said diaphragms, a weighted lever pivoted to a rigid support and supported at its opposite end, said lever forming a fulcrum for the first mentioned lever at a point between its attachment to said diaphragms, and means to limit the gravitating effect of the second mentioned lever upon the lever of which it forms a supporting fulcrum.

2. A sound intensifier for telephones comprising two or more vibratory diaphragms, a lever pivotally connected to adjacent diaphragms, a weighted lever pivotally connected at one end to a rigid support and forming a fulcrum for the first mentioned lever, an adjustable support for the other end of such lever for regulating the gravitating effect of the second mentioned lever upon the lever of which it forms a supporting fulcrum, and means to impart initial vibration to one of said diaphragms.

3. A sound intensifier for telephones comprising two or more vibratory diaphragms, electrical means adapted to initially vibrate one of said diaphragms, a lever pivoted to each of said diaphragms, a weighted lever pivoted to a rigid support and forming a fulcrum for the first mentioned lever at a point between its attachment to said diaphragms, and means for adjustably supporting said lever at the end opposite its pivoted end for regulating the gravitating effect of the second mentioned lever upon the lever of which it forms a supporting fulcrum.

In testimony whereof I have signed this specification in the presence of subscribing witnesses.

WILLIAM HOPPIE.

Witnesses:
CARL C. RASMUSSON,
GLADYS MORGAN,
A. G. HORN.